Patented Dec. 29, 1936

2,065,757

UNITED STATES PATENT OFFICE 2,065,757

MANUFACTURE OF CELLULAR PRODUCTS

Walter M. Scott, Wellesley, Mass., assignor, by mesne assignments, to Elizabeth M. Carsley, Boston, Mass.

No Drawing. Application May 17, 1934,
Serial No. 726,192

1 Claim. (Cl. 106—18)

The present invention relates to the manufacture of cellular products by beating a mass containing a liquid and capable of being frothed or swelled to increase its volume by inclusion of a gas and capable of hardening to produce a strong cellular product of light weight adapted for various uses, such as heat insulating or sound absorbing purposes or other structural or ornametal purposes. For causes heretofore unknown the time required to increase the volume of a mass of a given composition a predetermined amount has varied widely for different batches and has been uncertain.

I have discovered that the time required to increase the volume of a mass of a given composition by incorporating a gas therein can be reduced materially and is substantially the same for different batches if the atmosphere or gaseous medium which is in contact with the mass is maintained rich in the vapor of the liquid contained in the mass while the gas is being incorporated. In other words, the desirable effect referred to is obtained by having the atmosphere or gaseous medium in contact with the mass contain a proportion of the vapors of the liquid relatively high compared with the saturation point of those vapors in the gaseous medium in contact with the mass under the particular conditions of operation.

The practice of the invention is illustrated by the manufacture of approximately 100 gallons of a cellular material from a mass containing the following ingredients:

| | Pounds |
|---|---|
| Silicate "C" | 90 |
| Silicate "U" | 55 |
| Water | 45–65 |
| Pulverized limestone | 116 |
| Rock wool | 89 |
| Frothing agent | 1.5 |
| Borax | 6 |

The silicate "C" has a specific gravity of 59.1° Bé. and contains 18% sodium oxide, 36% silicon dioxide and 46% water. The ratio of silica to alkali is two to one. The silicate "U" has a specific gravity of 52° Bé. and contains 13.8% sodium oxide, 33.7% silicon dioxide and 52.5% water. The ratio of silica to alkali is 2.44 to one. The limestome contains at least 95% calcium carbonate and not over 2% magnesium carbonate and should be pulverized to such a degree of fineness that at least 95% will pass through a 100 mesh screen and at least 75% will pass through a 200 mesh screen. The rock wool employed is made, as I am informed, from blast furnace slag or molten calcium silicate. This material is particularly suitable for the purpose because it is fibrous, not inflammable and light in weight and the filaments of which it is composed are brittle so that they are readily broken into short lengths by the mixing and beating process to which the composition is subjected. The frothing agent may be, for example, a material of the type of the sodium salts of sulphates of fatty alcohols or the sodium sulfonates of fatty acids.

The water, preferably at a temperature greater than 70° F., is placed in a suitable mixer or beater, for instance, a Hobart mixer and in this is dissolved the borax and about one-fifth of the frothing agent. The silicates, preferably at a temperature about 70° F., and the limestone are added and the mixer is started at slow speed. The stirring is continued until the limestone is thoroughly wet out and evenly distributed throughout the mixture and the rock wool is then added slowly with continued stirring. The slow speed stirring is continued until the rock wool is thoroughly broken up and the resultant mixture, which is at first semi-solid and very stiff, is broken up and softened considerably. The mixer is then changed to second speed, the remainder of the frothing agent is added, and the frothing or beating in of air is continued until the mix has acquired the desired volume. The mixture is then placed in suitable molds to form tiles or slabs and dried and hardened or is applied directly to the walls or ceilings as a plaster and permitted to dry and harden. The final product is hard and durable and is water resistant.

The mixture is subjected to an atmosphere containing a high humidity while the air is being incorporated in it. Such an atmosphere may be maintained in the mixer by covering the top with a damp cloth during the mixing, or in any other convenient way. By this means the time required for frothing is not only materially reduced but also is kept practically constant from batch to batch. Without protection of the damp cloth the frothing fluctuates greatly with changes in the atmospheric humidity.

The formula given specifies a variation in water of from 45 to 65 pounds. The smaller amount of water is generally employed where a tile or plaster board is to be produced. When the frothed mixture is to be used as a plaster, the larger amount of water is preferable in order to impart smoother working qualities to the material. It is also to be noted that, other factors being constant, an increase of the proportion of water in the formula produces pores or cells of larger diameter in the finished material. An increase in the size of the cells also is obtained by frothing the material to a larger total volume.

I claim:

The method of making a cellular product which comprises mixing a filler with an aqueous liquid containing a sodium silicate solution, beating the mixture to aerate the same to form a cellular foamy mass of predetermined increased volume, and so enclosing the atmosphere in contact with the mixture during the beating operation as to maintain in said atmosphere a substantially uniform amount of the vapors of said liquid.

WALTER M. SCOTT.